W. LIVINGSTONE.
Manufacture of Bolts and Rivets.
No. 137,009. Patented March 18, 1873.
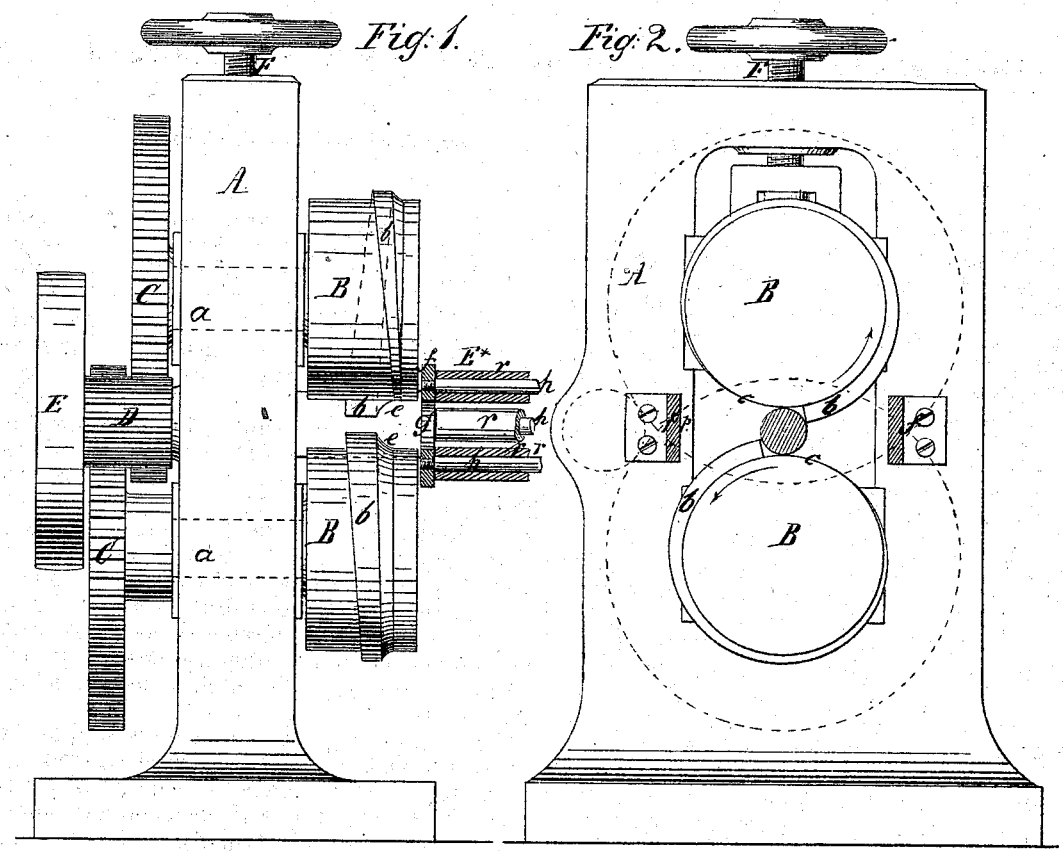
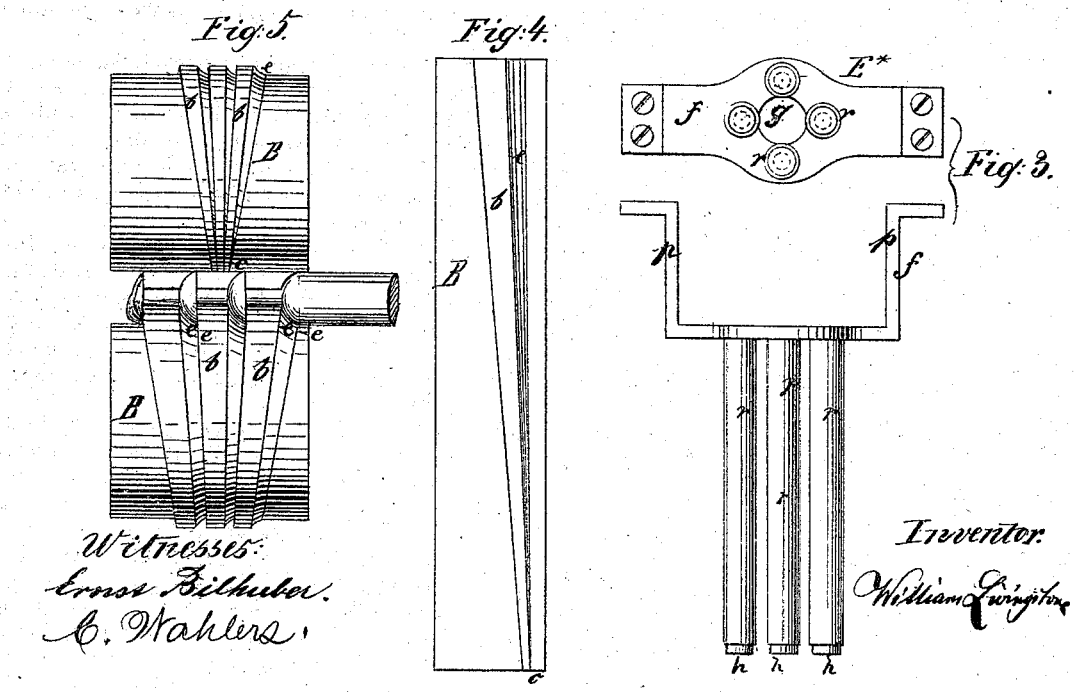

UNITED STATES PATENT OFFICE.

WILLIAM LIVINGSTONE, OF BROOKLYN, ASSIGNOR TO HIMSELF AND JOHN HENRY WHITNEY, OF NEW YORK, N. Y.

IMPROVEMENT IN THE MANUFACTURE OF BOLTS AND RIVETS.

Specification forming part of Letters Patent No. 137,009, dated March 18, 1873.

*To all whom it may concern:*

Be it known that I, WILLIAM LIVINGSTONE, of Brooklyn, in the county of Kings and State of New York, have invented a new and useful Improvement in Process and Machinery for Making Rivets, Bolts, and other articles; and I do hereby declare the following to be a full, clear, and exact description thereof, which will enable those skilled in the art to make and use the same, reference being had to the accompanying drawing forming a part of this specification, in which drawing—

Figure 1 is a side elevation of a machine by which I will illustrate my invention, the guide that supports the metal being partly in section. Fig. 2 is a front or end view thereof, the guide being removed. Fig. 3 represents an end and a plan view of the guide. Fig. 4 shows a plan of the cam of the shaping-roller. Fig. 5 is an elevation of a modification of my shaping-rollers detached from the frame of the machine.

Similar letters indicate corresponding parts.

This invention consists of a certain mode, hereinafter described, for making rivets, bolts, and analogous articles.

In carrying out my invention I employ two rollers of peculiar construction, between which rollers the metal is inserted in the direction of their axes.

The rollers are revolved in the same direction and with equal speed, and it follows, therefore, that those points of their peripheries which are opposite to each other, will move in one roller toward a plane going through both their axes, and in the other roller away from that plane, so that if a bar or cylinder of metal be placed between them parallel with their axes and direction of rotation they will act upon each side thereof with equal effect, and the bar or cylinder will be kept parallel, and will not be thrown out to one side or the other. If such rollers are plain, it is obvious that no change will be produced by them upon the metal inserted between them; but if their surfaces are irregular, the interposed metal will be changed in form accordingly. This is illustrated in the example of my invention which I have shown here, where I have provided each roller with a spiral cam, nearly surrounding the roller and terminating abruptly with a square end, so as to leave a portion of the periphery unoccupied. The rollers are so arranged that as they revolve corresponding parts of their cams will come opposite to each other, so that whatever is interposed between them will be acted upon by each equally at the same instant of time, so that the plain portions of the rollers, at the ends of the cams, will come opposite to each other and allow the metal to be inserted without interference from the cams. The rollers are adjustable, so that they can be brought to the right distance apart to come in contact with the bar or cylinder to be acted on, and on turning them their cams will not only give a corresponding shape to the bar or cylinder, but, by reason of their spiral form, will have a screw-like action thereon so as to draw it inward with a regular motion, the speed of which will be according to the pitch of the thread or sides of the cam.

The material to be acted on is supported by a suitable guide composed of elongated anti-friction rollers arranged concentrically in a frame fixed to the frame of the machine in such a manner as to project in front of the point where the rollers approach nearest to each other.

My invention is applicable both to flat, square, and cylindrical metal, the operation of the rollers being such that the cylindrical bar will be rotated on its own axis, while the flat or square bar will be held steadily, each, however, receiving endwise motion from the screw-like action of the cam.

In Fig. 1 I have shown one form of my improvement in side view. The letter A designates a frame which supports the mechanism, and E is a pulley on the shaft of the driving-pinion D, that engages gear-wheels C C mounted on the shafts $a$ of the reducing and shaping rollers B B. The rollers B B are fixed on their shafts, and are arranged parallel to each other, the shaft of the upper roller being mounted in a sliding bearing, which is raised or lowered by the screw F, so that the rollers can be set nearer to or further apart from each other to suit the size of the bar or cylinder to be inserted between them. Each roller B has upon its periphery a spiral cam, $b$, of the same shape and dimensions on each roller, nearly surrounding the roller, its large end terminating with a square shoulder parallel to the axis of the roller, the cam being so made that it becomes narrower and thinner toward its small end, where it vanishes on the surface of the roller, as shown in the drawing, so as to leave a part of the roller plain, as indicated at *c*, Fig. 2. Each roller and cam are counterparts of the other, so that the rollers can be substituted one for the other. The rollers are so arranged on their shafts that the plain parts *c* of their faces will come opposite each other. The cams here shown are intended for forming rivets with rounded heads, and the front sides of the cams are curved, as indicated at *e* for that purpose, while their inner or rear sides are straight. The letter E* designates a guide, by means of which a bar or cylinder can be guided to the rollers and supported while being acted upon. The guide consists of a frame, *f*, having arms *p p*, which extend at right angles to its front on each side of the rollers toward the face of the frame A, to which the ends of the arms are securely fastened. The front of the frame has an opening, *g*, which comes opposite the intermediate space between the rollers B, and is surrounded by anti-friction rollers *r*, three or more, whose peripheries are flush with the edge of the opening *g*, so as to give support to the bar of metal which is to be guided to the machine. The anti-friction rollers are mounted on shafts *h*, whose inner ends are supported in the frame *f*, while their outer ends are supported in a like frame (not here shown) at the other end of the guide.

The machine as shown in Figs. 1 and 2 is arranged for making rivets, the cam *b* being formed with that purpose in view, the operation being as follows: A round bar of hot iron is introduced between the rollers against the base of the cams *b*, and as the rollers are turned the bar is griped by the points of the cams and compressed and reduced in diameter by them as the rollers proceed in completing a revolution, the degree of reduction, both in depth and width, corresponding to the increasing height and width of the thread of the cam until the highest and widest part of the cam has acted on the bar, when the latter will be reduced, for a length or distance equal to the greatest width of the cam, to a diameter equal to the distance apart of the two opposing cams at their thickest parts, thereby forming the shank of the rivet; while the shank is being formed, the uncompressed portion of the bar, which extends beyond the narrow part of the thread of the cam, forms there a shoulder, by which the bar is fed along owing to the spiral form of the cam. This shoulder, after the first rivet is completed, consists of the bottom of the head of the succeeding rivet, the first shoulder and shank following it being refuse. During the formation of the first shank, the head of the rivet is formed by means of the curved or concave front side of the cams, so that, when a shank is completed, a head for the succeeding rivet is also completed. The work proceeds in this manner, the rivet-heads and shanks being formed in succession, and they may be cut off by any suitable cutting device as fast as they pass the inner ends of the reducing and forming rollers.

In Fig. 5 I have shown a modification where three cams are arranged in succession upon the rollers so as to produce three rivets complete at each revolution of the rollers.

In laying out the spiral cam *b*, as in laying out cams in other work, I provide that the breadth of the smaller end of the cam multiplied into the distance between it and the opposite plain surface of the opposing roller shall be about equal to the breadth of the base of the cam multiplied into the distance between it and the back of the opposing cam at a corresponding point, so that there will not be any excess of metal to clog the rollers or cams.

What I claim as new, and desire to secure by Letters Patent, is—

1. The method herein described of making rivets or bolts.

2. The combination of the rolls B and B, constructed essentially as described, with the journal-boxes, one or both of which is adjustable, and mechanism to rotate said rolls, in the manner substantially as described.

This specification signed by me this 29th day of July, 1872.

WILLIAM LIVINGSTONE.

Witnesses:
W. HAUFF,
E. F. KASTENHUBER.